UNITED STATES PATENT OFFICE.

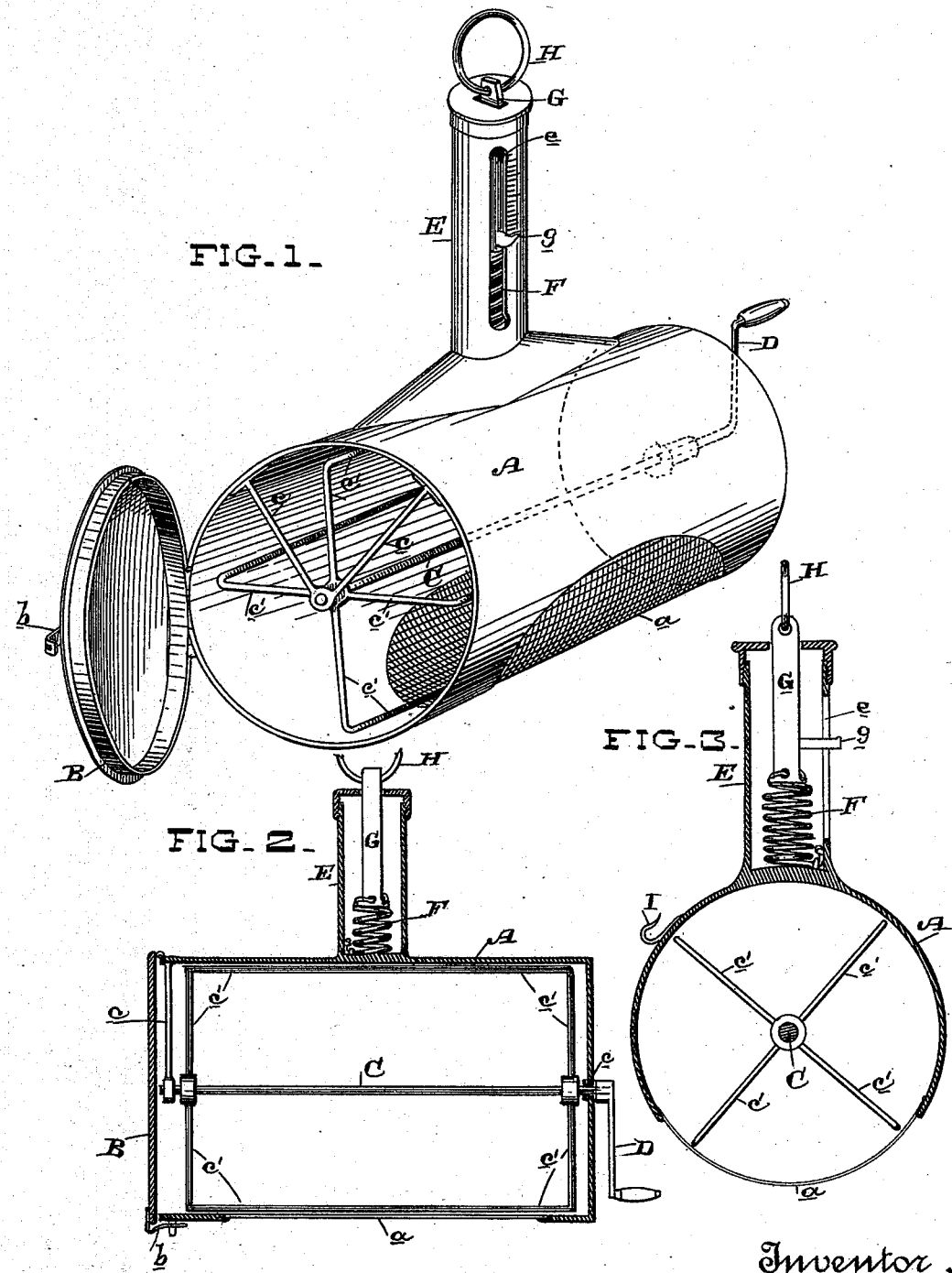

ADELINE T. EVANS, OF ST. JOHN, CALIFORNIA.

COMBINED FLOUR-SIEVE AND SCALES.

SPECIFICATION forming part of Letters Patent No. 413,823, dated October 29, 1889.

Application filed July 23, 1889. Serial No. 318,426. (No model.)

*To all whom it may concern:*

Be it known that I, ADELINE T. EVANS, of St. John, Colusa county, State of California, have invented an Improvement in Combined Flour-Sieve and Scales; and I hereby declare the following to be a full, clear, and exact description of the same.

My invention relates to the class of kitchen utensils, and especially to the class of flour sieves and scales.

My invention consists in the combined flour-sieve and weighing-scales hereinafter described, and specifically pointed out in the claims.

The object of my invention is to provide a simple utensil for readily weighing and sifting flour, and also for weighing other materials.

Referring to the accompanying drawings for a more complete explanation of my invention, Figure 1 is a perspective view of my sieve and scales. Fig. 2 is a vertical longitudinal section. Fig. 3 is a cross-section.

The flour-sifter portion of the utensil consists of a receptacle here shown in the form of the cylinder A, having in its base the sifting or sieve portion $a$. This cylinder is closed at one end, and the other end is provided with a hinged cover B, having a clasp $b$. Within the cylinder and carried in suitable bearings $c$ is a shaft C, carrying the radial stirrer arms or frames $c'$, which are adapted to rotate within the cylinder over the inner surface thereof and of the screen. One end of the shaft C is provided with a crank D on the outside, by which the stirrer is turned.

The upper portion of the cylinder A has formed with or secured to it in any suitable manner the hollow or tubular casing E, in which is confined the spring F, to which is secured the suspending-rod G, passing up through the top of the casing and carrying a suspending-ring H. A finger $g$, attached to this rod, projects upwardly through a vertical elongated slot $e$ in the casing, and is adapted to play over the graduations marked on the outside of said casing. Secured to the top of the cylinder A, near one side, is a hook I.

The operation of the utensil is as follows: It has now become more the custom to weigh flour in contradistinction to simply measuring it, and where the flour is to be weighed the operator throws back the end cover B and places the flour in the cylinder, and then, by holding the device up by the suspending-ring H, the weight of the flour in the cylinder can be accurately determined. As soon as the required weight is arrived at, the shaft C is rotated by its crank D, and the flour is sifted through the bottom screen $a$ of the cylinder. Other ingredients of the same composition or other materials may be also weighed by this device by attaching them or the parcels or receptacles in which they are carried to the hook I.

Having thus described my invention, what I claim as new, and desire to secure by Letters Patent, is—

1. The combined flour-sieve and scales consisting of the receptacle A, having the bottom screen, said receptacle being closed at one end and provided at the opposite end with a door, the rotating stirrers within the receptacle, the graduated hollow casing connected or formed with the top of the receptacle and having an elongated slot, the spring within the casing, the suspending-rod attached to the spring, and the indicating-finger connected with the rod and extending through the slot, substantially as described.

2. A combined flour-sieve and scales consisting of the receptacle A, closed at one end and having the bottom screen, the hinged cover at the opposite end of said receptacle, the central shaft in the receptacle projecting through the closed end thereof and having stirrer-arms, and the crank on the end of the shaft, the graduated hollow casing connected or formed with the top of the receptacle and having an elongated slot, the spring within the casing, the suspending-rod connected with the spring, and the indicating-finger carried by the rod and passing through the slot, substantially as described.

In witness whereof I have hereunto set my hand.

ADELINE T. EVANS.

Witnesses:
W. H. PAPST,
W. B. MILLER.